United States Patent Office 3,429,935
Patented Feb. 25, 1969

3,429,935
HIGH TEMPERATURE SUBSTITUTION REACTIONS OF HEXAFLUOROBENZENE
Leo A. Wall, Washington, D.C., and Joseph M. Antonucci, Silver Spring, Md., assignors to the United States of America as represented by the Secretary of the Navy
No Drawing. Filed Aug. 31, 1964, Ser. No. 393,447
U.S. Cl. 260—650                      6 Claims
Int. Cl. C07c 17/20, 25/14; C07b 29/04

The invention described herein may be manufactured and used by or for the Government of the United States of America for governmental purposes without the payment of any royalties thereon or therefor.

This invention relates to the reaction of hexafluorobenzene at high temeperatures.

The direct replacement of aromatic fluorine in hexafluorobenzene has hitherto only been possible by the use of nucleophilic reagents. With few exceptions all of these reactions may be classed as bimolecular nucleophilic substitution reaction. The feature common to all of these reactions is the displacement of the aromatic fluorine, as the fluoride ion, by a nucleophile of sufficient basicity. The general reaction is indicated by the following equation

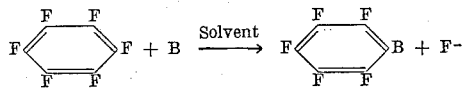

where B represents the nucleophilic reagent. The nucleophile may be: (1) an anionic base, e.g., alkali hydroxide, amide, or alcoholate; (2) a carbanionic base, e.g., alkyl, alkenyl or aryl lithium compounds; or (3) an uncharged base, e.g. ammonia, amines and related nitrogeneous bases. These nucleophilic reactions are usually conducted in solvents at moderate temperatures (0–300° C.).

In this invention, replacement was achieved by reactions at high temperatures, 300 to 1000° C., of hexafluorobenzene with such reagents as bromine, chlorine, trifluoroiodomethane and tetrafluoroethylene. Major products were bromopentafluorobenzene, chloropentafluorobenzene and perfluorotoluene. Halopentafluorobenzenes were also produced by passage at elevated temperatures of hexafluorobenzene over the appropriate aklali metal halide. The mechanisms for the former reactions are considered to involve free-radical intermediates while for the latter ionic reactions are more probable.

The object of the present invention is to prepare or synthesize derivatives of hexafluorobenzene by reacting said compounds at high temperatures and to find more efficient ways of preparing potential monomers for the synthesis of new polymers, in particularly thermally stable elastomers.

Another object of the present invention is the direct replacement of one or more of the aromatic fluorines by the reaction of hexafluorobenzene with non-nucleophilic or weakly nucleophilic reagents at elevated temperatures.

A further object of the invention is to provide a direct free-radical substitution method for the addition of a reagent to hexafluorobenzene.

A further object of the present invention is to provide a method of replacing the aromatic fluorine in hexafluorobenzene by reacting it with halogens at temperatures above 300° C.

A still further object of the present invention is to provide a method of replacing the aromatic fluorine in hexafluorobenzene by reacting it as temperatures above 300° C. with certain other reactants such as ammonia, $CFBr_3$, $CF_2Br_2$, $CF_3I$, $CF_2BrCF_2Br$, $CaCl_2$.

It is a still further object of the present invention to provide a method for the preparation of potential monomers by the pyrolysis of hexafluorobenzene over inorganic salts impregnated on carbon pellets at temperatures above 300° C.

It is a still further object of the present invention to provide a method for the preparation of useful compounds by the pyrolysis of hexafluorobenzene with potassium hydroxide, lithium iodide, potassium iodide, potassium bromide and potassium cyanide, impregnated on carbon pellets.

Other objects and many of the attendant advantages of this invention will be readily appreciated as the same becomes better understood by reference to the following detailed description.

Although hexafluorobenzene undergoes nucleophilic attack with comparative ease, the molecule appears to be quite inert to electrophilic attack. This lack of reactivity toward electrophilic reagents is in keeping with the unfavorable energetics involved in the expulsion of the aromatic fluorine as a cation.

Hexafluorobenzene, however, is susceptible to free radical attack. The few non-nucleophilic reactions of hexafluorobenzene that have been reported have indeed involved this type of attack. For example, hexafluorobenzene adds chlorine quite readily under rather mild conditions to give hexafluorohexafluorocyclohexane. The catalytic reduction of hexafluorobenzene to penta- and tetrafluorobenzene at 300° C. using a platinum catalyst on charcoal probable proceeds by a free radical mechanism. The pyrolysis of hexafluorobenzene in platinum at 850° C. results in the formation of octafluorotoluene and decafluorobiphenyl among other products. This interesting reaction which is the only example of a high temperature (above 300° C.) reaction of hexafluorobenzene reported to date, probably also involved free radicals.

There is some indirect evidence that other high temperature reactions of hexafluorobenzene are possible. In the synthesis of hexafluorobenzene by the pyrolysis of tribromofluoromethane, bromopentafluorobenzene and some other higher brominated by-products are formed along with copious amounts of bromine:

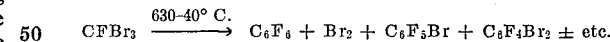

Two similar mechanisms have been postulated for the formation of hexafluorobenzene but none for the formation of bromopentafluorobenzene.

The pyrolysis of tribromofluoromethane may involve the formation of the transient intermediate bromofluorocarbene. One possible mechanism for the formation of hexafluorobenzene via this intermediate is shown below:

(1) $2CFBr \rightarrow CFBr=CFBr$
(2) $3CFBr=CFBr \rightarrow C_6F_6Br_6$
(3) $C_6F_6Br_6 \rightarrow C_6F_6 + 3Br_2$ A second possible mechanism that has been postulated would involve the formation of difluoroacetylene ($CF \equiv CF$) and its subsequent cyclic trimerization to hexafluorobenzene. The former mechanism, although it does involve bromine containing precursors, can explain the formation of products such as bromopentafluorobenzene only if the elimination of bromine fluoride can occur to some extent along with the energetically more favored process of debromination. Of course, it is conceivable that the bromopentafluorobenzene and similar by-products might arise from secondary reactions of bromine and the newly formed hexafluorobenzene, e.g.:

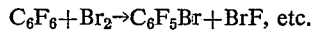

$$C_6F_6 + Br_2 \rightarrow C_6F_5Br + BrF, \text{ etc.}$$

In the light of the early work of Desirant which indicated that hexafluorobenzene does undergo high temperature reactions with itself, a reaction between hexafluorobenzene and bromine is quite possible at high temperatures.

In order to test the reactions of hexafluorobenzene in the gas phase, bromine and hexafluorobenzene were copyrolyzed through a Vycor tube packed with Pyrex glass helices. The examination of the pyrolysates from several runs revealed the presence of significant amounts of bromopentafluorobenzene (5–25% conversions, 85–95% yields) along with smaller quantities of polybromo derivatives of hexafluorobenzene.

The successful replacement of fluorine in hexafluorobenzene by bromine suggested that other high temperature replacement reactions of hexafluorobenzene with other co-reactants might be feasible. Consequently, several other pyrolyses were conducted employing both inorganic and organic reactants. In general, the method simply involves the simultaneous passage of hexafluorobenzene and the second reactant through a hot tube under a stream of nitrogen. The reactor tube may be unpacked or filled with a catalytic or an inert packing material. The reactor may be a Vycor, quartz or platinum tube. Packing material included Pyrex glass helices, glass wool, carbon pellets, nickel turnings and platinum gauze.

The apparatus and methods which are used in these experiments may be listed as follows. The reactor used in this study was a Vycor tube 54 cm. by 2 cm. (ID) equipped with 24/40 standard taper joints at either end. The tube was placed in a vertical position in an electric furnace and the lower end was connected to three traps in series cooled by a Dry Ice-acetone slurry. The last trap carried a drying tube filled with anhydrous calcium sulfate. The upper end of the tube was equipped with one or two pressure-equalized dropping funnels carrying a gas inlet tube. The pyrolysis temperature was ascertained by an iron-constantan thermocouple fastened at one end to the outside of the reactor tube midway in the heated zone (about 25 cm.) and connected at the other end to an Alnor pyrometer. In the copyrolysis experiments the Vycor tube was packed throughout the heated zone with Pyrex glass helices (⅛ in.). In the high temperature reactions with inorganic salts, the reactor tube was packed throughout the heated zone with activated carbon pellets (4/6 mesh, National Carbon Company) which had been impregnated with the appropriate inorganic salt. The ratio by weight of inorganic salt to carbon pellets was usually 1 to 1. The impregnated pellets were dried prior to use by gradually preheating the reactor for about 24 hours until the desired reaction temperature was attained. All the pyrolytic reactions of hexafluorobenzene were performed under a slow stream of nitrogen gas at approximately atmospheric pressure.

In the copyrolysis experiments the following techniques were employed:

(1) For reactants miscible with hexafluorobenzene, a solution of known concentration was added at a slow drop rate (approximately one every ten seconds) to the reactor by means of a pressure equalized dropping funnel.

(2) Gaseous reactants, such as chlorine, were allowed to slowly distill into the reactor through a gas inlet tube whose end was emersed in the hexafluorobenzene contained in the dropping funnel.

(3) For reactants that were not completely miscible with hexafluorobenzene (e.g., bromine) it was necessary to employ two pressure-equalized dropping funnels connected parallel to the reactor by means of a Y adapter. The drop rate for each reactant was adjusted accordingly so that the two reactants were always present in the reactor in low concentration.

In the experiments involving inorganic salts as the co-reactant, the hexafluorobenzene was simply added at a certain drop rate (approximately one drop every 15 or 20 seconds) to the reactor via the dropping funnel. An alternate technique was to slowly distill the hexafluorobenzene through the reactor either at atmospheric or reduced pressure.

Copyrolysis of hexafluorobenzene and bromine:

Approximately 14.4 g. of bromine and 5.5 g. of hexafluorobenzene were copyrolyzed at 650° C. The pyrolysate after removal of unreacted bromine weighed 5.7 g. Examination of the pyrolysate revealed that two components were present. About 90% of the mixture was hexafluorobenzene. The other component accounted for the remaining 10%. The second component was shown to be bromopentafluorobenzene by comparison of retention times with an authentic sample. Isolation of the components by preparative vapor-phase chromatography using an 8 ft. by ¾ inch column packed with 40/60 mesh acid-washed chromosorb W which was coated with 25% by-weight SE silicone elastomer gave 5.1 g. of recovered hexafluorobenzene and 0.5 g. of bromopentafluorobenzene. The identification of the second component was confirmed by mass spectroscopic analysis and by comparison of boiling points. The conversion to the bromo derivatives was 8% and the yield was 94%.

The same experiment was repeated but at 740° C. Vapor-phase chromatographic analysis revealed that the conversion of hexafluorobenzene to bromopentafluorobenzene was increased about three-fold. Two other products were also formed in addition to the monobromobenzene but they were present in the extent of only 5–10%. The conversion to products was about 25–30% and the yield of bromopentafluorobenzene was 85–90%.

Reaction of hexafluorobenzene with lithium iodide:

About 11 g. of hexafluorobenzene was dropped through the Vycor reactor packed with carbon pellets which had been impregnated with lithium iodide. The reactor tube was kept at 570° C. and the reaction was performed under a slow stream of nitrogen at atmospheric pressure. A fair quantity of free iodine formed on adding the hexafluorobenzene. The pyrolysate after removal of the iodine by washing with a saturated solution of sodium thiosulfate and drying weighed 8.55 g. Vapor-phase chromatographic analysis revealed the presence of three components. The first component (90%) was hexafluorobenzene, the second component after isolation was shown by mass spectroscopic analysis to be pentafluorobenzene. Similarly, the third component was identified as pentafluoroiodobenzene. A small amount of higher boiling component was also isolated. The conversion to products based on recovered hexafluorobenzene was 30%. The yield of the iodo derivative was about 20% and that of the pentafluorobenzene was about 40%.

The pyrolysates from the various runs were worked up by the usual organic techniques such as washing to remove corrosive materials, drying and distillation. When product separation was difficult or impractical by distillation, preparative vapor-phase chromatography was employed.

Since the major products from these reactions were known compounds, preliminary identification was made by comparison of physical properties. When the compound was available, comparison of vapor-phase chromatographic retention times was used to establish identity. Mass spectroscopic analysis was used to confirm the preliminary identification. Yields were usually calculated by vapor-phase chromatographic analysis of the pyrolysate.

TABLE I.—HIGH TEMPERATURE REACTIONS OF HEXAFLUOROBENZENE COPYROLYSIS OVER GLASS HELICES

| Reactant | Temp. (° C.) | Products | Conversion to products (percent) | Yield of mono derivative (percent) |
|---|---|---|---|---|
| $Br_2$ | 650 | $C_6F_5Br$ | 8 | 94 |
| $Br_2$ | 740 | $C_6F_5Br$, $C_6F_4Br_2$(?) | 25–30 | 85–90 |
| $Cl_2$ | 700 | $C_6F_5Cl$, other chloro products | 50 | 85 |
| $SO_2Cl_2$ | 700 | $C_6F_5Cl$, other chloro products | 75 | 80 |
| $I_2$ | 650 | $C_6F_5I$ (trace) | | 90 |
| $H_2O$ | 700 | $C_6F_5OH$, $C_6F_5H$ | 5 | 90 |
| $NH_3$ | 650 | $C_6F_5NH_2$ | 5 | 90 |
| $CFBr_3$ | 680 | $C_6F_5Br$, $C_6F_4Br$ (?) | 50 | 90 |
| $CF_2Br_2$ | 680 | $C_6F_5Br$ (main), $C_6F_5CF_3$ (minor), $C_6F_4Br_2$ (trace) (?). | 35 | 90 |
| $CF_3I$ | 700 | $C_6F_5CF_3$ (main) | 10 | 90 |
| | 700 | $C_6F_5I$ (minor) | 20 | 85 |
| | 760 | | 30 | 85 |
| $CF_2BrCF_2Br$ | 670 | $C_6F_5Br$ | 20 | 80–85 |
| $CF_2=CFBr$ | 690 | $C_6F_5Br$, other bromo products | 30 | 80–85 |
| $CF_2=CFCl$ | 670 | $C_6F_5Cl$, other chloro products | 20 | 90–95 |
| $CF_2=CF_2$ | 850 | $C_6F_5CF_3$ | 15 | 90–95 |
| $CF_3CF=CF_2$ | 800 | $C_6F_5CF_3$ | 10 | 90 |
| CaCl (4 mesh) | 700 | $C_6F_5Cl$ | | |

Pressure, 760 mm.

As shown in Table I, the conversions for the copyrolysis reactions ranged from trace amounts to 75%. Net yields of the monosubstituted derivatives of hexafluorobenzene were of the order of 75–95%. The material recovery of aromatics both starting material and products was excellent. For example, hexafluorobenzene and bromine in molar ratio of 1 to 3 gave at 650° C. an 8% conversion to bromopentafluorobenzene (95% yield). At 740° C. the conversion to products was about 25%. Although bromopentafluorobenzene was still the major product (85% yield), other higher brominated derivatives ($C_6F_4Br_2$, etc.) began to appear though in much smaller quantity (10% yield).

Excellent yields of bromopentafluorobenzene are also obtained by copyrolysis of hexafluorobenzene with certain bromofluoroalkanes (Table I). The conversion to products was fair to good with alkanes such as 1,-2- dibromotetrafluoroethane, dibromodifluoromethane and tribromofluoromethane. In addition to excellent yields of bromopentafluorobenzene, the first two reagents also gave significant amounts of octafluorotoluene. Higher conversions of hexafluorobenzene to octafluorotoluene were obtained when trifluoroiodomethane, tetrafluoroethylene or hexafluoropropylene was the co-reactant. Trifluoroiodomethane also gave pentafluoroiodobenzene as a minor product.

Attempts to synthesize octafluorostyrene by copyrolysis of hexafluorobenzene with chlorotrifluoroethylene or bromotrifluoroethylene apparently did not result in the formation of any appreciable amounts of the vinyl compound but the corresponding halopentafluorobenzene was formed in fair conversions (80–90% yields). Smaller amounts of higher boiling aromatic products were obtained in each pyrolysis but these have not yet been characterized.

Chloropentafluorobenzene can also be obtained by the copyrolysis of hexafluorobenzene with chlorine sulfuryl chloride. The conversions are quite good and the monosubstituted derivative is produced in high yield (80–85%). Smaller amounts of high boiling products are also present but these have not as yet been characterized.

Copyrolysis of hexafluorobenzene and iodine gave low conversion to the desired pentafluoroiodobenzene although in excellent yield. The low conversion may have been due to some experimental difficulties encountered in the addition of iodine simultaneously with hexafluorobenzene.

Similarily, water and ammonia gave only trace amunts (5%) of the monosubstituted aromatic products. However, it may be possible to increase the conversions by modification of certain reaction conditions.

A related study was made of the high temperature reactions of hexafluorobenzene with certain inorganic salts. The technique employed in this case involved the passage of hexafluorobenzene under a stream of nitrogen through a heated Vycor tube filled with carbon pellets which had been impregnated with the appropriate inorganic salts. The results are shown in Table II.

TABLE II.—PYROLYSIS OF $C_6F_6$ OVER INORGANIC SALTS IMPREGNATED ON CARBON PELLETS

| Tube packing | Temp. (° C.) | Products and approximate yield | Conversion (percent) |
|---|---|---|---|
| KOH/carbon | 500 | $C_6F_5OH$ (40%), $C_6F_5H$ (40%) | 10 |
| LiI/carbon | 570 | $C_6G_5I$ (20%), $C_6F_5H$ (40%) | 30 |
| KI/carbon | 500 | $C_6F_5I$ (40%), $C_6F_5H$ (40%) | 15 |
| KBr/carbon | 600 | $C_6F_5Br$ (60%), $C_6F_5H$ (30%) | 20 |
| KCN/carbon | 570 | $C_6F_5CN$ (70%), $C_6F_5H$ (20%) | 5 |

Although only a few reactions of this type have been run, the results seem promising. In general, the conversions have been low (5–15%). For example, hexafluorobenzene and lithium iodide at 570° C. gave only low conversion to pentafluoroiodobenzene. Pentafluorobenzene and an unidentified high boiling product were also formed in small amounts. Some free iodide was also produced and 85% of the hexafluorobenzene was recovered unchanged.

The other salts listed in Table II gave similar results with hexafluorobenzene. The main product was the monosubstituted derivatives but pentafluorobenzene was always a significant by-product.

In one experiment the inorganic salt was used as the packing material. The pyrolysis of hexafluorobenzene over anhydrous calcium chloride (4 mesh) heated to 700° C. gave a 10% conversion to products. The major product (90%) was chloropentafluorobenzene. The minor products were not identified but are probably polychloro derivatives of hexafluorobenzene, pentafluorobenzene was not observed in the products.

Hexafluorobenzene is only readily attached by certain basic nucleophiles; otherwise, it is extremely difficult to effect displacement of the ring fluorines. The results of this study, however, clearly demonstrate that direct replacement of one or more of the aromatic fluorines also can be achieved by the reaction of hexafluorobenzene with non-nucleophilic or weakly nucleophilic reagents at elevated temperatures.

The excellent thermal stability of hexafluorobenzene lends itself quite well to high temperature reactions where extensive decomposition and carbonization are common problems in the pyrolytic reactions of most organic compounds.

The copyrolysis experiments of hexafluorobenzene with such reactants as bromine and dibromodifluoromethane probably proceeded by a free radical mechanism. Several mechanisms for this type of reaction can be postulated:

*Direct free-radical substitution*

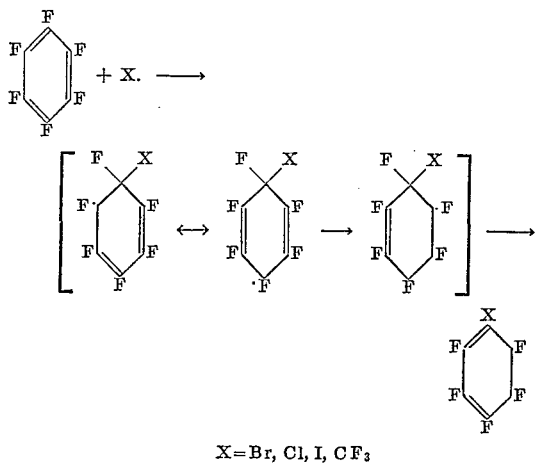

X=Br, Cl, I, CF₃

*Chain propagating free-radical substitution*

(1)

(2)

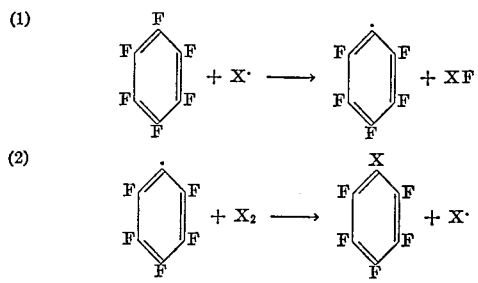

*Addition-elimination*

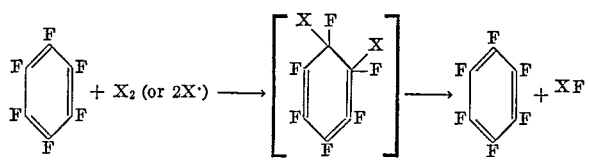

Mechanism A involves addition of the radical X to hexafluorobenzene to give a new intermediate free-radical which gives the monosubstitution product by displacement of fluorine. Mechanism C is related to Mechanism A and involves the prior addition of two radicals (2X) to hexafluorobenzene to give unstable cyclohexadienyl intermediate which then loses fluorine as a halofluoride. A varient of this last mechanism would involve the addition of the reactant as a bimolecular species X₂ to give a transient intermediate such as:

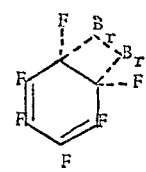

which can be bond disruption and formation lead to the monosubstituted pentafluorobenzene derivative and the interhalogen species XF. Mechanism B is analogous to that proposed for the high temperature vapor-phase halogenations of benzene (C₆F₆).

It is significant that the reaction of perfluoroalkanes with reactants such as bromine or chlorine at high temperatures results in the cleavage of the carbon-carbon bond or the fluorocarbon, whereas with the perfluoroaromatics, cleavage of the carbon-fluorine bond occurs.

In the copyrolysis of hexafluorobenzene with such reactants as dibromodifluoromethane and tetrafluoroethylene, octafluorotoluene is one of the principle products. The formation of this aromatic compound (C₆F₅CF₃) probably occurs by a "net insertion" reaction of the reactive species, difluorocarbene. Several mechanistic paths are possible as shown below:

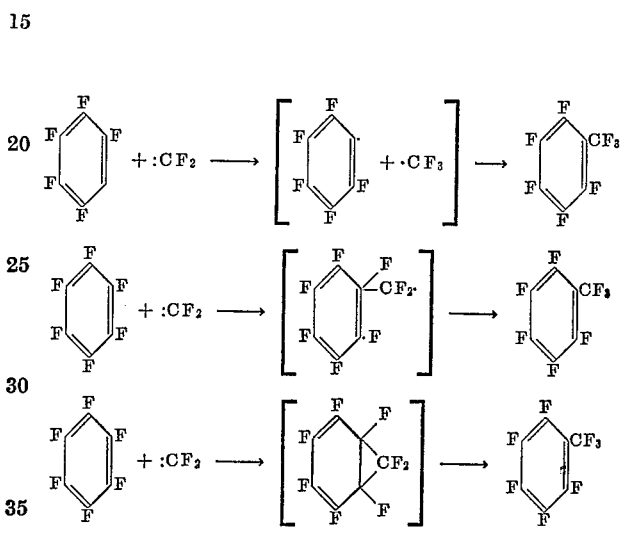

Net insertion reactions of difluorocarbene have been reported for the P-F and N-F bonds.

In the experiments dealing with the high temperature reactions of hexafluorobenzene and inorganic salts impregnated on carbon pellets the reaction mechanism may be ionic or a combination of ionic and free radical.

In addition to their theoretical interest these high temperature reactions are potentially valuable as a direct method of synthesis of monohalopentafluorobenzenes and polyhalofluorobenzenes in one step from hexafluorobenzenes, a process not previously known.

Several variables are involved in the pyrolytic reactions such as the type of reactor tube and its dimensions, the packing material, temperature concentration of the reactants and the contact time.

Obviously many modifications and variations of the present invention are possible in the light of the above teachings. It is therefore to be understood that within the scope of the appended claims the invention may be practiced otherwise than as specifically described.

What is claimed is:

1. A process consisting essentially of reacting hexafluorobenzene and a halogen selected from the group consisting of bromine, chlorine and iodine under a stream of nitrogen, in a hot tube containing a packing material selected from the group consisting of Pyrex glass helices, glass wool, carbon pellets, nickel turnings and platinum gauze at a temperature between 300° and 1000° C.

2. A process according to claim 1 wherein the halogen is iodine.

3. A process according to claim 1 wherein the halogen is bromine.

4. A process according to claim 1 wherein the halogen is chlorine.

5. A process according to claim 1 wherein the packing material is Pyrex glass helices.

6. A process according to claim 1 wherein the packing material is carbon pellets.

References Cited

UNITED STATES PATENTS

| | | | |
|---|---|---|---|
| 2,927,138 | 5/1958 | Wall et al. | 260—650 |
| 3,033,905 | 5/1962 | Wall et al. | 260—650 |

FOREIGN PATENTS

| | | |
|---|---|---|
| 477,048 | 9/1951 | Canada. |
| 556,271 | 4/1958 | Canada. |

OTHER REFERENCES

Wall et al., Jour. of Research of National Bureau of Standards, vol. 67A, No. 5, September–October 1963, pp. 481–497.

Stevenson, Ind. and Eng. Chem. (1948), vol. 40, pp. 1584–89.

LEON ZITVER, *Primary Examiner.*

H. MARS, *Assistant Examiner.*

U.S. Cl. X.R.

260—651, 623, 629, 581, 465